United States Patent [19]

Shonai et al.

[11] Patent Number: 4,725,947
[45] Date of Patent: Feb. 16, 1988

[54] DATA PROCESSOR WITH A BRANCH TARGET INSTRUCTION STORAGE

[75] Inventors: Tooru Shonai, Kokubunji; Shunichi Torii, Musashino, both of Japan

[73] Assignee: Hitachi, Ltd., Tokyo, Japan

[21] Appl. No.: 645,672

[22] Filed: Aug. 30, 1984

[30] Foreign Application Priority Data

Aug. 31, 1983 [JP] Japan ................................ 58-159903

[51] Int. Cl.⁴ ............................................. G06F 9/26
[52] U.S. Cl. .................................................. 364/200
[58] Field of Search ... 364/200 MS File, 900 MS File

[56] References Cited

U.S. PATENT DOCUMENTS

| 3,551,895 | 12/1970 | Driscoll, Jr. | 364/200 |
| 3,940,741 | 2/1976 | Horikoshi et al. | 364/200 |
| 4,130,869 | 12/1978 | Kinoshita et al. | 364/200 |
| 4,315,314 | 2/1982 | Russo | 364/200 |
| 4,399,507 | 8/1983 | Cosgrove et al. | 364/200 |
| 4,430,711 | 2/1984 | Anderson et al. | 364/200 |

Primary Examiner—Gareth D. Shaw
Assistant Examiner—Christina Eakman
Attorney, Agent, or Firm—Antonelli, Terry & Wands

[57] ABSTRACT

In order to allow fast execution of branch instructions even with the possibility of branching to different target instructions from the same branch instruction, a target instruction storage provides the target instruction in response to the branch instruction address and address data associated with a target instruction address.

14 Claims, 10 Drawing Figures

| TKNP | TKN | WRITE DATA ||||||| COLUMN ADDRESS | ROW ADDRESS |
|---|---|---|---|---|---|---|---|---|---|
| | | V | IAU | INS | GRB | GRX | IG | | |
| 0 | 1 | 1 | D | D | D | D | D | LOWER 16 BITS OF BRANCH INSTRUCTION | RNi |
| 1 | 1 | 1 | D | D | D | D | D | LOWER 16 BITS OF BRANCH INSTRUCTION | RN |
| 1 | 0 | 0 | D | D | D | D | D | LOWER 16 BITS OF BRANCH INSTRUCTION | RN |

DATA PROCESSOR WITH A BRANCH TARGET INSTRUCTION STORAGE

BACKGROUND OF THE INVENTION

The present invention relates in general to a digital processor, and more particularly, to a processor which is provided with a buffer storage.

A conventional computer attains high speed operation by executing a stream of instructions in a pipeline manner, i.e., in an overlapping manner. If a branch instruction appears in the stream, however, its processing performance drops because a disturbance occurs in the otherwise smooth flow of the pipeline operation. Therefore, in order to improve the processing performance of the computer, it is essential to process a branch instruction at a high speed.

To better understand this problem, various examples of branch instructions as provided in the IBM System/370 will be explained with reference to FIGS. 1A to 1D.

Figure 1A:
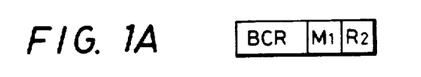
FIGS. 1A to 1D, respectively, show examples of various branch instructions.

FIG. 1A shows the instruction format of a BCR instruction. This instruction branches to an instruction whose address is equal to the content of one of the general registers designated by an $R_2$ field, if a condition code CC set within an arithmetic unit by a previous instruction satisfies the branch condition designated by a mask field (M1).

Figure 1B:
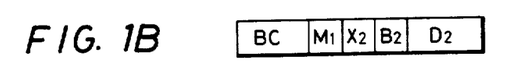

FIG. 1B shows the instruction format of a BC instruction. This instruction branches to an instruction whose address is equal to the sum of the contents of two of the general registers designated respectively by the $X_2$ and $B_2$ fields of the instruction and the value of the displacement field $D_2$.

Figure 1C:
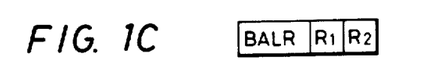

FIG. 1C shows the instruction format of a BALR instruction. This instruction stores the content of a present PSW (program status word containing the next instruction address) in one of the general registers designated by the $R_1$ field, and branches to an instruction whose address is equal to the content of one of the general registers designated by the $R_2$ field.

Figure 1D:
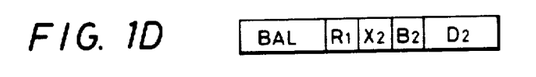

FIG. 1D shows the instruction format of a BAL instruction. This instruction stores the content of the present PSW in one of the general registers designated by the $R_1$ field, and branches to an instruction whose address is equal to the sum of the contents of two general registers designated by the $X_2$ and $B_2$ fields and the value of the $D_2$ field.

There are several other types of branch instructions, but for executing any such instruction, the processing performance of the computer drops because the smooth flow of the pipeline operation becomes disturbed due to the fact that some time lag inevitably occurs before a branch target instruction is fetched from the main storage after detection of the branch instruction. In order to execute the branch instruction at a high speed, therefore, the fetching of the branch target instruction must be speeded up.

A branch target instruction buffer storage was proposed for this purpose by the Horikoshi et al U.S. Pat. No. 3,940,741, which is assigned to the same assignee as the present invention. The buffer storage, referred to as a route memory by Horikoshi et al, comprises an associative memory which stores a target instruction when a branch is attained for the first time for each branch instruction and produces the following two outputs by use of the instruction address (IA) of a decoded instruction as a key when decoding each branch instruction thereafter:

(i) A target instruction (TI); and
(ii) An output (BA) indicating whether or not there is a high probability of fullfillment of a branch condition by the decoded branch instruction.

According to this prior art approach, a target instruction for a branch instruction need not be fetched from the main storage when the branch instruction is executed a second time since the target instruction is available in the faster route memory. However, we have recently found that the prior art target instruction buffer storage involves the following problem. Namely, since only the instruction address (IA) of the branch instruction is used as the key to make reference to the target instruction buffer storage, the target instruction buffer storage cannot handle a situation where one branch instruction branches to any one of a plurality of target instructions.

Figure 2:
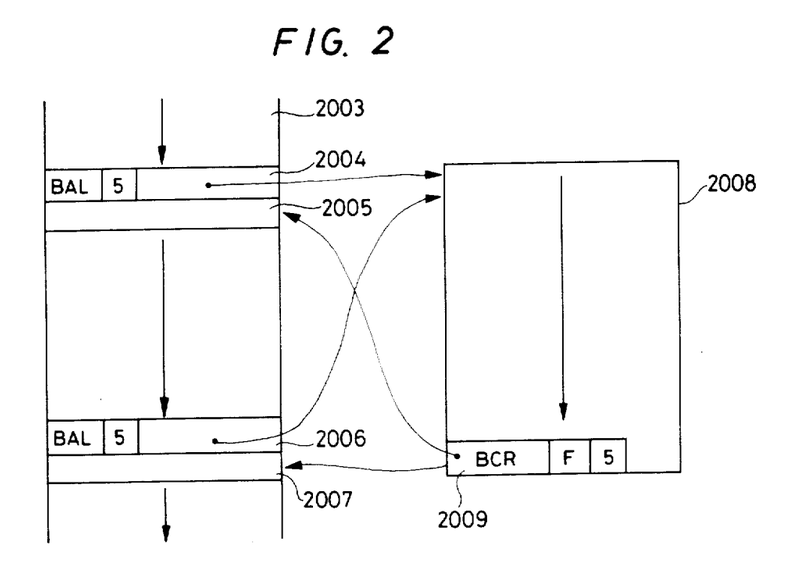
FIGS. 2 and 3 are schematic diagrams which respectively show a first and a second example of branch operations which produce problems in prior art systems.

For example, considering the case shown in FIG. 2, the flow changes from a branch instruction 2004 in a main routine 2003 to the leading address of a sub-routine 2008, then returns to an instruction 2005 in the main routine 2003 at the completion of the BCR instruction 2009 of the sub-routine 2008. The flow then changes once again at a branch instruction 2006 to the same sub-routine 2008 and returns again to an instruction 2007 from the BCR instruction 2009 after completion of the sub-routine 2008. In this case, according to the prior art, the instruction 2005 and the address of the instruction 2005 are stored in the target instruction buffer storage, when the flow returns to the instruction 2005 from the BCR instruction 2009 for the first time. Thus, the flow cannot return to the instruction word 2007 on the basis of what is stored in the target instruction buffer storage, when the BCR instruction 2009 is executed the second time. In this example, F in the mask field of the BCR instruction 2009 shows that the branch should be effected unconditionally, i.e., independently of a condition code.

Another example of the problem will be explained with reference to FIG. 3, where the flow branches to one of the three sub-routines A, B or C from a BC instruction 3002 in the main routine 3000, depending on the value stored in a general register 5 whose content is determined by the conditions $p_1$, $p_2$ as shown by steps 3010, 3012 and 3014. Here it is assumed that 10,000 is stored in advance in the general register 5. In this case, the target address of the BC instruction 3002 changes to 10,100, 10,200 or 10,300 depending upon which value is set into the register 5, so that the target instruction buffer storage which uses only the instruction address as the key to the target instruction does not always provide a correct target instruction.

From the foregoing examples described with reference to FIGS. 2 and 3, it is apparent that the prior art is not capable of satisfactorily responding to all conditions of repeated branching or conditional branching, so that the prior art provides a less than complete solution to the problem of increased speed in the handling of branch instructions.

SUMMARY OF THE INVENTION

It is therefore an object of the present invention to provide a target instruction buffer storage which can produce a correct target instruction even when one branch instruction branches to one of a plurality of potential target instructions.

In order to accomplish the object described above, a target instruction storage is provided which stores a target instruction of a decoded branch instruction, an instruction address of the decoded branch instruction, and at least one additional address data which is necessary in order to specify the target instruction address, and produces as its output the target instruction of the decoded branch instruction when the same instruction address and the same additional address data are provided thereto as a key to the storage.

DETAILED DESCRIPTION OF THE PREFERRED EMBODIMENT

Figure 4:
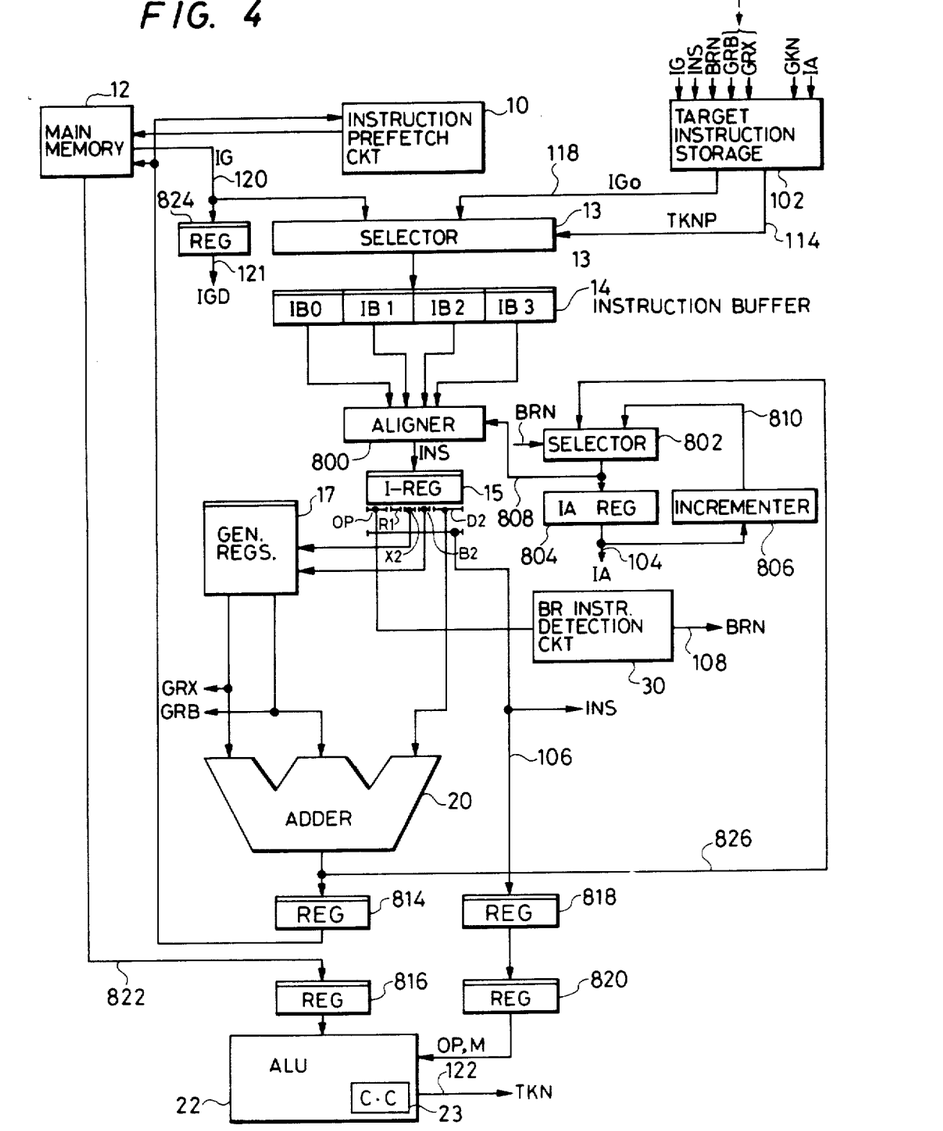
FIG. 4 is a schematic block diagram showing an embodiment of the present invention.

Referring to FIG. 4, the data processing unit to which the present invention is directed includes a target instruction storage 102, an instruction prefetch circuit 10, a main memory 12, an instruction buffer 14 for buffering a group of prefetched instructions, an instruction register 15, an aligner 800 for taking out an instruction to be stored in the instruction register 15 from the instruction buffer 14, an instruction address register 804 for holding an address of the instruction in the instruction register 15, a branch instruction detection circuit 30 for detecting whether or not the instruction in the instruction register is a branch instruction, a group of general purpose registers 17, an address adder 20, and an arithmetic and logical unit (ALU) 22.

The target instruction storage 102 produces on line 118 a group of instructions $IG_0$ including a target instruction $I_T$ of a decoded branch instruction and produces on line 114 a signal TKNP indicating provision of the instruction group $IG_0$ to the selecter 13 in response to an instruction address IA of a decoded branch instruction and the values GRX, GRB of the general registers designated by the register designation fields of the decoded branch instruction, as will be explained in more detail hereinafter.

Figure 6:
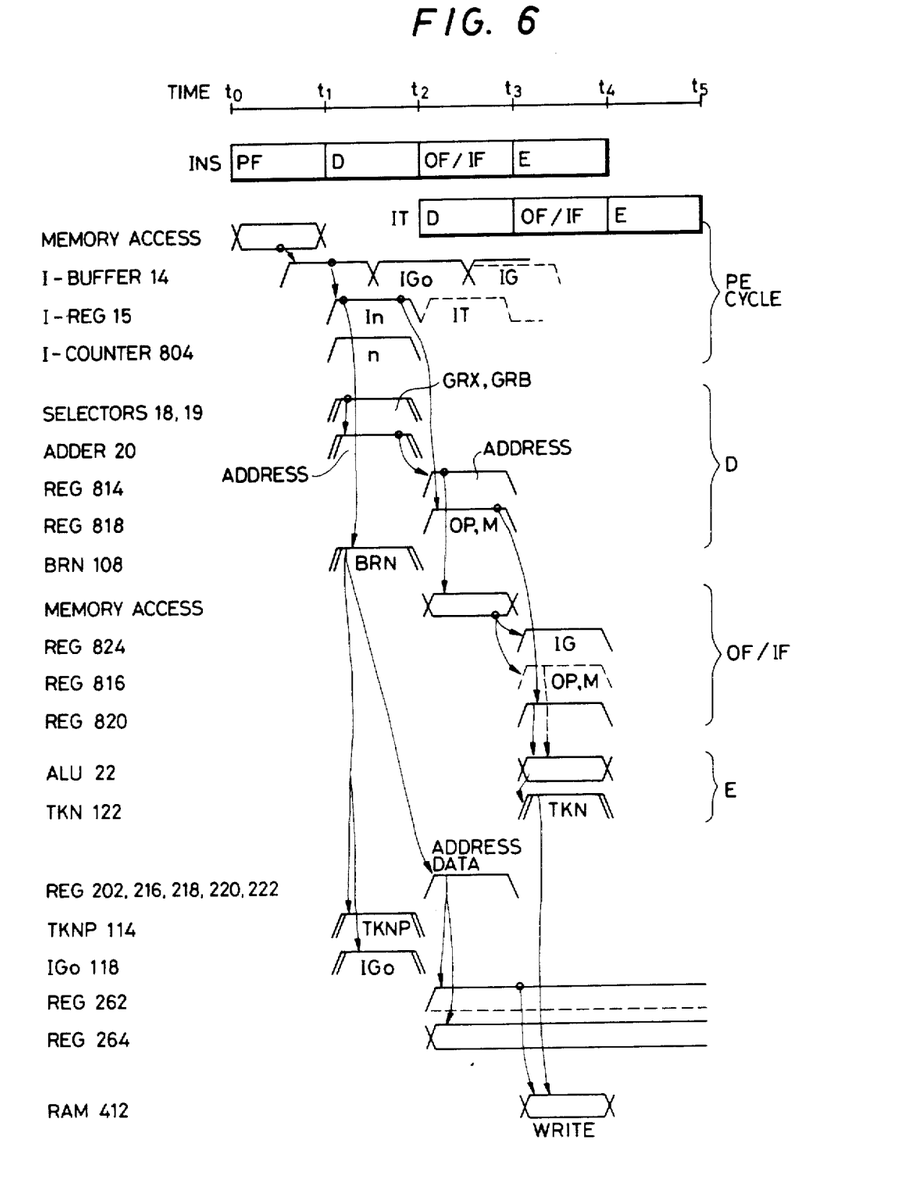
FIG. 6 is a timing chart relating to the operation of the circuit shown in FIGS. 4 and 5.

The overall operation of the processor will be described with reference to the timing chart of FIG. 6. In FIG. 6, $t_0$ represents the start of a prefetch (PF) cycle for fetching instructions from the main storage 12. In a PF cycle, the instruction prefetch circuit 10 makes access to the memory 12 by application of a fetch address and a fetch request thereto, reads out one instruction group IG onto a line 120 and stores it in the instruction buffer 14 through a selector 13. This basic prefetch operation is well known in the art. The selector 13 is controlled so that it normally selects the instruction group IG on line 120 unless the signal TKNP is provided on line 114. In the case described above, it is assumed that there is no TKNP signal on line 114 during the PF cycle.

One instruction INS is taken out by the aligner 800 from the instruction group IG in the instruction buffer 14 in response to an instruction address on line 808 and is stored in the instruction register 15 at a time $t_1$. Instruction addresses are sequentially generated on the line 808 by the instruction address register 804, an incrementer 806 and a selector 802. When a branch does not occur, the incrementor 806 produces the address of the next instruction on the signal line 810, which is stored in the instruction address register 804 through the selector 802 in synchronism with the storage of the next instruction in the instruction register 15. When a branch occurs as indicated by detection circuit 30, an address given by the adder 20 is selected as the next instruction address by the selector 802 under control of the signal BRN on line 108. Thus, the instruction address register 804 stores therein the address IA of the current instruction INS that is stored in the instruction register 15.

In the D cycle in FIG. 6, the value GRB of a base register within the general purpose registers 17 and the value GRX of an index register also in the general purpose registers 17 are read out on lines 110, 112 in response to the base field $B_2$ and the index field $X_2$ of an instruction INS in the instruction register 15, and these two values are added by the address adder 20 to a displacement value $D_2$ from the instruction register 15. The result is stored in the register 814 at a time $t_2$. The result represents an operand address when the instruction INS in the register 15 is an instruction which needs to fetch an operand from the main memory, but the result is a target instruction address when the instruction INS in the register 15 is a branch intruction. The instruction INS in the instruction register 15 is transferred to the register 818 at the time $t_2$.

A detection circuit 30 decodes the operation code OP of the instruction in the instruction register 15, and provides the branch signal BRN on a line 108 when the decoded instruction is a branch instruction. This signal BRN is provided to the target instruction storage 102 to enable access thereto. The address IA of the instruction INS in the instruction address register 804 is delivered to the target instruction storage 102 through a line 104, and at the same time, the instruction INS itself is delivered to the target instruction storage 102 through a line 106. The values GRB, GRX of the base register and index register are also sent to the target instruction storage 102 on lines 110 and 112, respectively.

In response to these inputs to the target instruction storage 102 a group of instructions $IG_O$ including a target instruction $I_T$ is provided on line 118 and a signal TKNP is provided on line 114 at a timing $t_1$ if the instruction INS is a branch instruction, as indicated by the presence of signal BRN, and the group of instructions $IG_O$ including the target instruction IT for the decoded branch instruction is already stored in the storage 102. On the other hand, if the group of instructions is not found in the storage 102, the signal TKNP will not be generated on line 114, and the system will then have to wait until the target instruction is received from the main memory 12 in a prefetch operation to be started in the next cycle, as will be described hereinafter. Thus, a D cycle for the target instruction $I_T$ can be started from time $t_2$ without delay, as shown in FIG. 6, if the group of instructio $IG_O$ is present in the target instruction storage 102. If the storage 102 is not provided, or if storage 102 does not store the group of instructions $IG_O$ including the target instruction $I_T$ for the decoded branch instruction, the D stage for the target instruction $I_T$ can be started only at the time $t_3$, as will be explained later. Thus, the target instruction storage 102 is useful to speed up the start of a target instruction.

When the group of instructions is not present in the target instruction storage 102, access is made to the main memory 12 on the basis of the address in the register 814 beginning with time $t_2$. In particular, the address produced at the output of the adder 20 is applied to the instruction prefetch circuit 10 to initiate a prefetch of the instruction group IG containing the target instruction from the main memory 12. When the instruction group IG which includes the target instruction is read out from the main memory 12, it is delivered to the instruction buffer 14 via a line 120 and the selector 13 and is stored in the instruction buffer 14 at a time between times $t_2$ and $t_3$. The address of the target instruction is available at time $t_2$ on line 826 from the adder 20, and this address is inserted into the instruction address register 804 via selector 802 under control of the signal BRN. The instruction group IG is also set in the register 824 at a time $t_3$. In this case, the D stage for the target instruction $I_T$ can be started only at time $t_3$.

The fetching of an instruction group IG is performed even in cases where the group of instructions which includes the target instruction IT is already stored in the target instruction buffer 102. This is because the storage 102 can be simplified, as will be explained later on.

When instructions other than a branch instruction are executed, operand data is read out from the main memory 12 to the register 816 through a line 822 to be stored therein at the time $T_3$ in response to the address provided from register 814 to the main memory 12. The instruction already stored in the register 818 is transferred to the register 820. This concludes the operation of the OF/IF cycle.

In the E cycle, the ALU 22 performs an arithmetic or logical operation beginning with the time $t_3$. The operation code OP and a mask field M, if there is any, of the instruction in the register 820 are applied to the ALU 22. The ALU 22 checks a condition code 23 stored therein when the input OP code is for a branch instruction. The ALU 22 provides to the target instruction storage 102 a TKN signal via the line 122 when a designated branch condition is satisfied. When the branch instruction is an unconditional branch instruction, the ALU provides the signal TKN irrespective of the condition code. The target instruction storage 102 rewrites its content during the E cycle. In this regard, any target instruction which was obtained from the main memory 12 will be written into the storage 102 at this time. The details of that operation will be explained later. This completes the operation of the E cycle.

Figure 5:
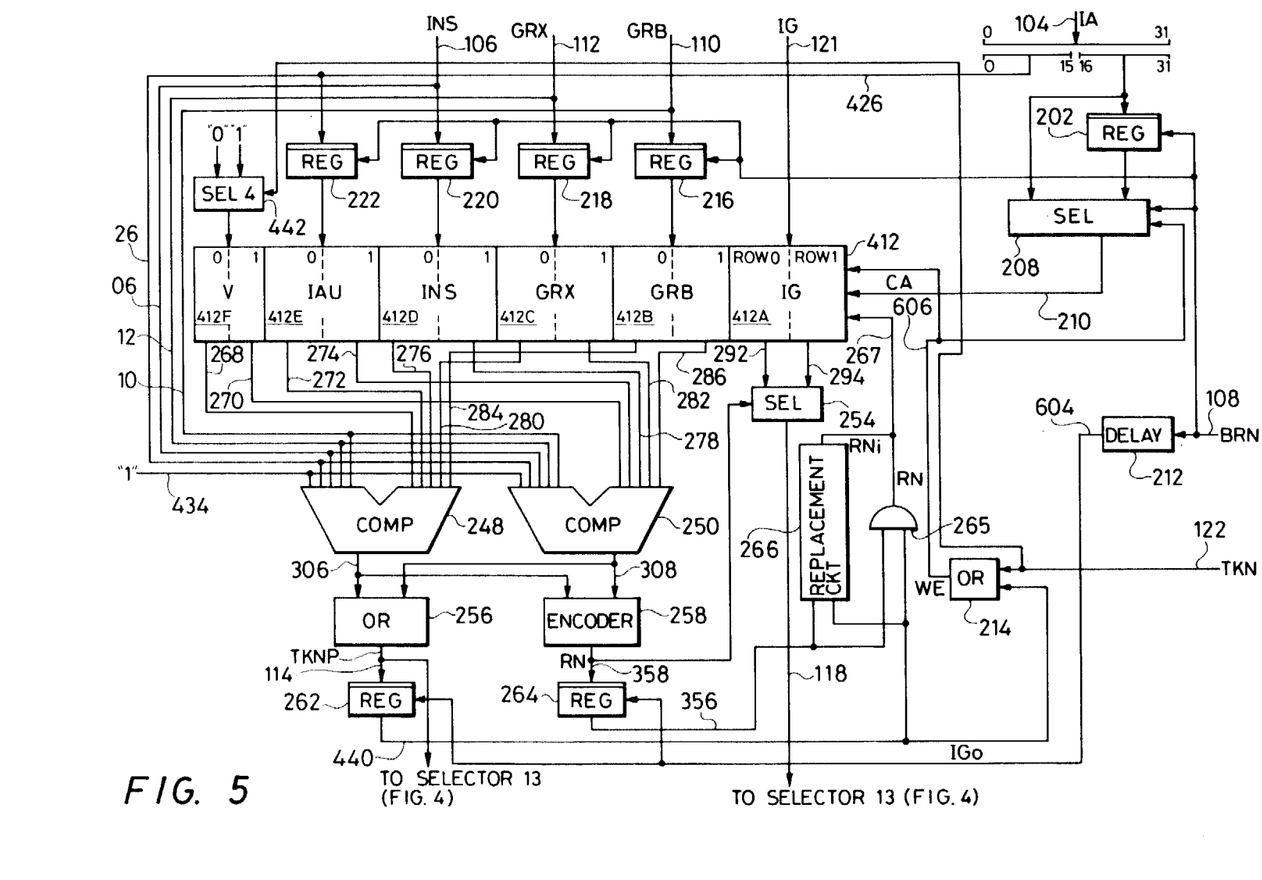
FIG. 5 is a detailed block diagram of the target instruction storage as used in the embodiment of FIG. 4.

FIG. 5 shows the construction of the target instruction storage 102, the principle component of which is a RAM 412, consisting of an IG field 412A, a GRB field 412B, a GRX field 412C, an INS field 412D, an IAU field 412E and a valid (V) field 412F. Instruction groups each including a target instruction for a branch instruction are stored in the IG field 412A; the values of the base registers are stored in the GRB field 412B; the values of the index registers are stored in the GRX field 412C; and the branch instruction itself is stored in the INS field 412D. The upper 16 bits of the branch instruction addresses are stored in the IAU field 412F. Target instruction storage 102 can be regarded as an associative memory which receives, as a key thereto, the values of a base register and an index register, an instruction address, and the branch instruction itself. Each field of RAM 412 consists of two rows by 65536 ($2^{16}$) columns. Through this embodiment uses two rows by 65536 columns, it should be apparent that an arbitrary number of rows and columns can be used.

Next, the operation of the target instruction storage 102 will be described in detail.

(a) The Read Operation.

As was explained already in connection with FIGS. 4 and 6, the signal BRN appears on line 108 in the D cycle of the processing of an instruction, when the instruction is a branch instruction. In response to the signal BRN, a selector 208 provides the RAM 412 with the lower 16 bits of the decoded instruction address IA via the line 210, as a column address CA. The RAM 412 reads out the data stored in the column designated by the column address CA. That is, the data in the row 0 and row 1 of the valid field 412F is read out to the lines 268 and 270, respectively, and the data in the row 0 and row 1 of the IAU field 412E is read out to the lines 272 and 274, respectively. The data in the row 0 and row 1 of the INS field 412B is read out to the lines 276 and 278, respectively, and data in the row 0 and row 1 of the GRX field 412C is read out to lines 280 and 282, respectively. The data in the row 0 and row 1 of the GRB field 412B is read out to lines 282 and 286, respectively, and the data in the row 0 and row 1 of the IG field 412A is read out to lines 292 and 294, respectively.

The data read out from the row 0 of the various fields (except for the IG field 412A) and the data read out from the row 1 from the various fields (except for the IG field 412A) are applied to the comparators 248 and 250, respectively. The comparators 248 and 250 also receive the applied key consisting of the upper 16 bits IA of the decoded instruction address, the decoded instruction INS itself, the values GRB and GRX of the base register and the index register both designated by the decoded instruction, and a fixed value "1" via lines 426, 106, 112, 110 and 434, respectively. The comparators 248 or 250 produce "1" on output line 306 or 308 when the input associative key, such as the upper 16 bits IAU of the address of the decoded branch instruction, the values GRB, GRX of the base and index registers and the instruction INS for the newly decoded instruction are equal to the corresponding data of row 0 or 1 of the IAU field 412E, the GRB field 412B, the GRX field 412C and the RNS field 412D, respectively, and when the value V of the valid field 412F is equal to "1" provided on line 434. Otherwise, the comparators 248, 250 produce "0" at their output.

When the instruction group including the target instruction corresponding to the associative key is registered in the branch target storage, either the row 0 coincidence line 306 or the row 1 coincidence line 308 is enabled, and an OR circuit 256 produces the signal TKNP on a line 114 during the D cycle, as shown in FIG. 6. Responding to the signals on lines 306 and 308, the encoder 258 produces, on a line 358, a row number RN for which the coincidence is detected.

The row number RN, which designates either row 0 or row 1 in the IG field, is applied to a selector 254, which transfers an instruction group $IG_0$ read out from one of the rows 0 and 1 of the IG field 412A, designated by the row number RN, onto a line 118 at the time $t_1$, as seen in FIG. 6. When the TKNP signal is provided on a line 114 during the D cycle of the branch instruction, the selector 13 (FIG. 4) selectively sends the instruction group $IG_0$ to the instruction buffer 14 in response to the signal TKNP. Thus, the instruction group $IG_0$ is set in the instruction buffer 14 at a timing between $t_1$ and $t_2$. Then, the target instruction $I_T$ included in the instruction group $IG_0$ is selectively set in the instruction register 15, at the timing $t_2$. Thus, the D cycle for decoding the target instruction $I_T$ can be started from the time $t_2$ without delay.

When the instruction group containing the target instruction word corresponding to the associative key is not registered in row 0 or row 1, both lines 306 and 308 become "0", and the OR circuit 256 does not provide the signal TKNP.

(b) The Write Operation.

Prior to starting the writing operation to RAM 412, the lower 16 bits of the decoded branch instruction address IA received on the line 104 are written into the register 202 in response to the BRN signal, while the upper 16 bits of the address IA of the decoded branch instruction on the line 104 are written into the register 222 in response to the signal BRN, both operations occurring at the time $t_2$, as shown in FIG. 6. Similarly, the value of the base register on line 110, the value of the index register on line 112 and the instruction on line 106 are written into the registers 216, 218 and 220, respectively. A delay 212 is provided to delay the signal BRN for one cycle. The TKNP signal on line 114 and the row number RN on line 358 are written into registers 262 and 264, respectively, in response to the delayed BRN signal at a timing $t_2$. As was explained previously, the ALU 22 judges to see if the branch condition is satisfied during the E cycle, and provides a signal TKN onto line 122 at the time $t_3$ when the result of this judgement is affirmative.

In synchronism with the operation described above, a write enable signal WE is applied onto a line 606 by an OR gate 214 only when the register 262 provides the TKNP signal on a line 440 or the TKN signal is provided on a line 122. The write enable signal WE is applied to RAM 412 via a line 606 in order to initiate a write operation, and is also applied to the selector 208, which in response to this signal selects the lower 16 bits of the branch instruction address stored in the register 202 for application to RAM 412 through a line 210 as a column address CA thereto. The second TKN is applied to a selector 442, which applies data V having a value of 1 or 0 to the field 412F of RAM 412 depending upon whether or not the signal TKN is provided on line 122, respectively.

Figure 7:
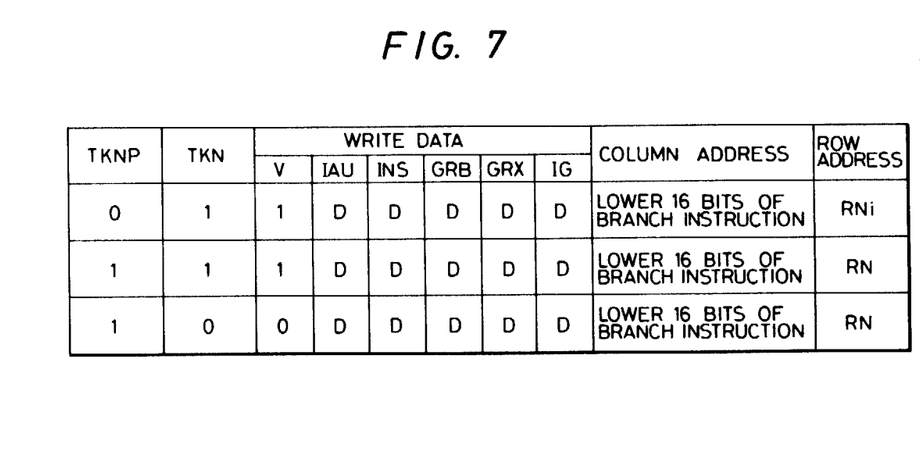
FIG. 7 is a table explaining the writing operation to a random access memory used for the target instruction storage of FIG. 5.

The write operation to RAM 412 differs depending upon which of the signals TKNP and TKN are generated. FIG. 7 shows three different cases. In FIG. 7, D represents the writing of data. The column address CA does not change in any of the exemplary cases explained below.

During the write operation, the value of the base register, the index register, the branch instruction and the upper 16 bits of the branch instruction address all related to the branch instruction and already stored in the registers 216, 218, 220 and 222, respectively, are written into the GRB field 412B, the GRX field 412C, the INS field 412E, and the IAU field 412F of the ram 412, respectively, for all of the three cases in FIG. 7. In addition, for all cases, the instruction group IG as provided on line 121 is written into the IG field 412A of the RAM 412. When the register 262 does not provide the signal TKNP, but the TKN signal is provided on the line 122, the logic "1" is written into the valid field 412F by the selector 442. As a result, it is determined that the instruction group IG including a target instruction and the associative key corresponding to the former, both to be newly stored in the target instruction storage 102, are valid. In this case, this data is written into the rows selected on the basis of a replacement circuit 266 operating on the basis of the conventional least recently used algorighm or a first-in, first-out algorithm and providing on line 267 in response to previously generated row numbers RN, a row number $RN_i$ in which new data is to be written only when the signal TKNP is not provided on line 356. Such replacement circuit will not be discussed in detail because it is irrelevant to the present invention. In FIG. 7, the row number for the writing operation in the case is shown as $RN_i$.

When the register 262 provides the signal TKNP, and at the same time, the TKN signal is provided on line 122, the logic "1" is written into the valid field 412F as the selector 442 selects "1" in response to this signal. In this case, RAM 412 performs a write operation at a row having a number equal to the number RN on line 356, which member is provided to the RAM 412 via the line 267 by a gate 265 which responds to the signal TKNP on line 440 to transmit the row number RN on line 356 to the line 267. Accordingly, the instruction group IG containing the target instruction is written into a location for which the instruction group $IG_0$ containing the target instruction has been read out in the read cycle. This corresponds to a case where the target instruction for a decoded branch instruction is already stored in the target instruction buffer 102 and the ALU has detected that the branch condition for the decoded branch instruction is fulfilled. In actuality, no writing is necessary in this case, but the above-mentioned write operation is performed for the sake of simplicity in the design of the control circuit for the RAM 412. Having a writing operation in this type of situation is also effective, if an erasing of data within the RAM 412 is effected by the replacement circuit 266 operating according to the well-known least recently-used algorithm, because the entry for which the write operation is performed will not be erased so soon thereafter if it is refreshed so to speak each time it is accessed.

When the register 262 provides the TKNP signal, but the TKN signal is not provided on the line 122, the selector 442 selects "0" and the logic "0" is written into the valid field 412F. In this case, RAM 412 performs a writing operation at the row number equal to RN on line 356, as already described above. This indicates that the instruction group $IG_0$ containing the target instruction $I_T$ and the associative key corresponding to that instruction have been invalidated in the ram 412A. This corresponds to the case where the target instruction storage 102 already contains the target instruction for a decoded branch instruction, but the branch condition for this branch instruction is not fulfilled. Therefore, the invalidation of the corresponding data within the ram 412A is desirable, because, when the same instruction is again executed, the storage 102 can show that the anticipation of fulfillment of the branch condition by the decoded branch instruction is low. This means that the writing of V having a value 0 is necessary, but the writing of the other data into fields 412A through 412E is not necessary. However, the writing of all data into the RAM 412 is effected anyway in this case for the same reason as explained for the case where both the signals TKNP and TKN are generated.

No operation is effected when neither the TKNP signal nor the TKN signal is provided.

Figure 3:
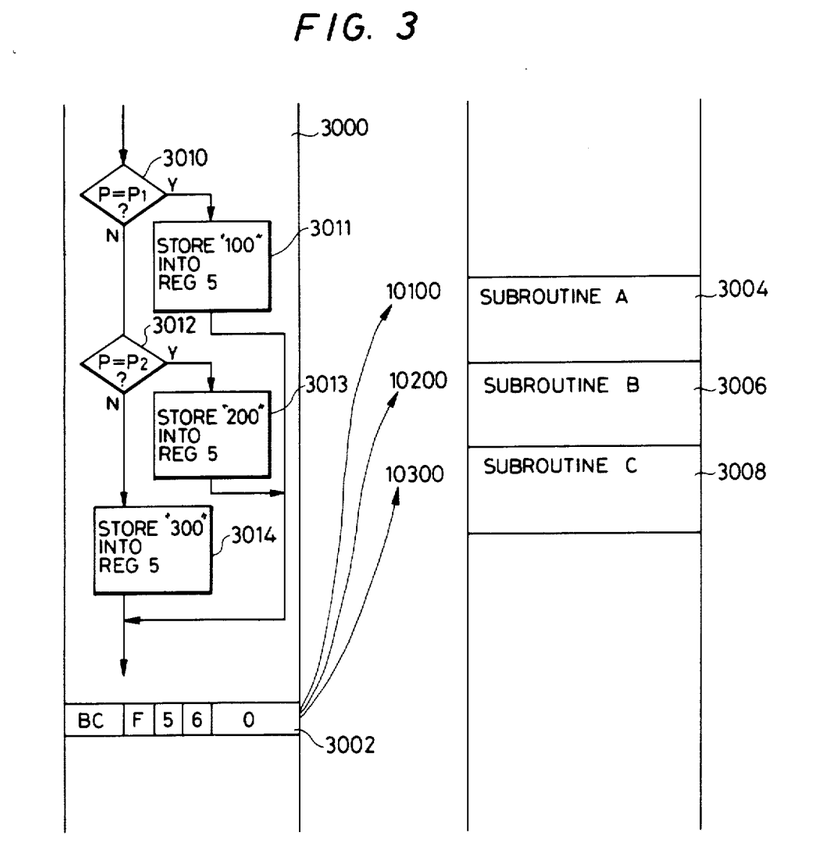

By provision of the target instruction storage 102 as described herein, the problem presented in relation to the flow chart of FIG. 3 can be eliminated. When, in the case of FIG. 3, the BC instruction 3002 branches to the 10100 address, the 10200 address or the 10300 address for the first time, the target instruction storage 102 stores the upper 16 bits of the instruction address of the BC instruction 3002, the instruction 3002 itself, the value in the index register 5, the value in the base register 6 and the instruction group containing the branch target instruction $I_T$, into one of the rows of the column determined by the lower 16 bits of the instruction address of the BC instruction 3002 during the write cycle of the ram 412. When the branch to the same branch target instruction occurs at a later time, the upper 16 bits of the instruction address, the target instruction $I_T$, the value in the index register 5, the value in the base register 6 and the instruction group $IG_0$ containing the branch target instruction can be read out from one of the rows of the column determined by the lower 16 bits of the instruction address of this BC instruction 3002 during the D cycle. In this case, the signal TKNP on line 144 becomes "1" at the time $t_1$, as shown in FIG. 6, and the instruction group $IG_0$ containing the branch target instruction $I_T$ is produced on the signal line 118. Since the TKNP signal on line 114 is "1", the instruction group provided on the line 118 is stored in the instruction buffer 14 through the selector 13 exactly at the mid-point between the times $t_1$ and $t_2$, as shown in FIG. 6. Furthermore, the branch target address on the output line 826 of the address adder 20 is stored in the instruction counter 804 through the selector 802 and a line 808. The aligner 800 extracts the branch target instruction from the instruction buffer and stores it in the instruction register 15. Accordingly, the D cycle of the branch target instruction is started from the time $t_2$.

In this manner, if the branch to the same branch target instruction occurs a second or subsequent time, as in the case of FIG. 3, the branch target buffer storage 102 produces the instruction group containing the correct branch target instruction.

Where the content of the register designated by the $R_2$ field is the branch target address, such as with the case of the BCR instruction shown in FIG. 2, the GRX signal line 112 in the embodiment shown in FIG. 4 is provided with the value of the register $R_2$ while the GRB signal line 110 is provided with zero. The address on line 112 is provided to the main memory 12 instead of the output of the register 814, in order to fetch the instruction group IG. In this manner, the upper 16 bits of the instruction address of the BCR instruction, the BCR instruction itself, the content of the general register designated by the $R_2$ field, zero and the instruction group containing the branch target instruction are stored in the branch target buffer storage 102 in one of the rows of the column determined by the lower 16 bits of the instruction address of the BCR instruction when the BCR instruction 2009 first branches to the instruction 2005 and this same operation occurs with respect to another designated row in the storage 102 when the BCR instruction 2009 is branched to the instruction 2007.

When the branch to the same branch target instruction again occurs, the instruction group $IG_o$ containing the branch target instruction $I_T$ is produced on the signal line 118 in the read cycle which is in synchronism with the D cycle of the BCR instruction 2008. Thereafter, processing proceeds in the same way as explained with reference to FIG. 3. In the case of FIG. 2, the branch target buffer storage 102 produces the instruction group containing the correct branch instruction word if the branch to the branch target instruction occurs a second or subsequent time.

The embodiment described above uses the instruction word itself as part of the associative key in place of the displacement information of the instruction word. Therefore, it is possible to detect whether or not a given branch instruction is rewritten by other instructions, such as a store instruction and becomes a different instruction, during the period in which the branch instruction is executed for the first time and is registered in the branch target instruction storage until it is executed for the second time. If the branch instruction becomes a different instruction, the TKNP signal line 114 produces "0" in the read cycle for executing the branch instruction for the second time.

In the embodiment above, address data such as values GRB, GRX in the base register and index register are used as part of the associative key to the storage 102. It is possible to modify the embodiment so that it will give other address data such as the target instruction address itself, as provided from the output of the adder 20 as the associative key to be supplied to the storage 102, but the present embodiment is preferred because the values GRB, GRX become available earlier than the target instruction address itself. From this point of view, it is more desirable to use as the address data, the base register number RB and index register number RX instead of the value in each of the two registers.

Furthermore, in the described embodiment, the branch instruction itself is used as one of associative keys. This allows detection of a case where the branch instruction in a main storage 12 has been damaged in some way, after execution of the branch instruction. In this case, coincidence cannot be detected between the branch instruction as an associatve key provided to the storage 102 and a branch instruction already stored in the storage 102. For sake of simplicity, however, we can use the displacement field $D_2$ of the branch instruction instead of the instruction itself, because the displacement field $D_2$ is part of the branch target instruction.

In the described embodiment, the main memory 12 is accessed even in cases where a branch target instruction $I_T$ is already stored in the target instruction buffer 102. In these cases, however, as is clear from the explanation given for those cases, it is possible to delete the memory access for fetching the instruction group IG, and also to delete write the data IAU, INS, GRX, GRB and IG into RAM 412A in those cases. For that purpose, it is enough to modify the embodiment so that the field 412F of the RAM 412 is accessible separately from other fields thereof, and the signal TKNP should be applied to the instruction fetch circuit to control the instruction group fetch thereby.

What is claimed is:
1. A digital processor, comprising:
  a main storage for storing instructions and operand data;
  instruction register means for holding an instruction to be executed;
  means connected to said main storage for sequentially fetching instructions from said main storage into said instruction register means;

decode means connected to said instruction register means for detecting whether or not the instruction held thereby is a branch instruction;

instruction address means responsive to receipt of an instruction in said instruction register means for generating an instruction address of said instruction;

address data means connected to said instruction register means and responsive to a branch instruction held in said instruction register means for generating address data related to the address of a target instruction for the branch instruction held in said instruction register means;

storage means for storing plural sets of data, each set of data including a branch instruction address of a branch instruction, a target instruction for the branch instruction and address data related to that target instruction;

read means connected to said storage means, said instruction address means and said address data means and responsive to detection of a branch instruction by said decode means for reading from said storage means a target instruction for the branch instruction included in one set of said sets of data selected in accordance with both the same branch instruction address as given by said instruction address means and said address data given by said address data means; and means connected to said storage means for supplying the read out target instruction from said storage means to said instruction register means.

2. A digital processor according to claim 1, wherein said address data means includes:

register means, including plural general registers, responsive to a register designating field within said branch instruction held in said instruction register means for selectively providing as said address data at least one value contained in at least one of said general registers designated by the branch instruction.

3. A digital processor according to claim 2, further comprising means for calculating the target instruction address of a target instruction for the branch instruction held in said instruction register means based on said one value obtained from said general registers and means for applying said target instruction address to said main storage to fetch said target instruction from said main storage.

4. A digital processor according to claim 1, wherein said address data means includes:

register means, including plural general registers, responsive to plural register designating fields within said branch instruction for providing, as said address data, plural values each contained in a respective one of said general registers as designated by the branch instruction held in said instruction register means;

said digital processor further comprising means for adding said plural values and a further field of the branch instruction to obtain a target instruction address and means for applying said target instruction address to said main storage to fetch the target instruction from said main storage.

5. A digital processor according to claim 1, wherein said address data means includes means responsive to the branch instruction held in said instruction register means for generating and providing the target instruction address of a target instruction for the branch instruction held in said instruction register means as said related address data.

6. A digital processor according to claim 1, wherein said address data means includes means for providing at least part of the branch instruction held in said instruction register means as said address data.

7. A digital processor according to claim 6, wherein said part of said branch instruction forming said address data is a register designating field.

8. A digital processor of claim 6, wherein said part of said branch instruction forming said address data is a displacement designating field.

9. A digital processor according to claim 1, wherein said instruction supply means includes:

first means for detecting whether or not the target instruction for the branch instruction held in said instruction register means is already stored in said storage means based on the instruction address generated by said instruction address means and the address data provided by said address data means;

access means responsive to the branch instruction held in said instruction register means for accessing said main storage to fetch the target instruction from said main storage;

second means responsive to the branch instruction held in said instruction register means for detecting whether or not the branch operation required by said branch instruction is to be allowed based upon the branch instruction;

write means for writing a set of said target instructions fetched from said main storage along with said branch instruction address and the address data relating thereto into said storage means, in response to a negative detection result from said first means and a positive detection result from said second means.

10. A digital processor of claim 1, further comprising:

first means responsive to the branch instruction held in said instruction register means for detecting whether or not the branch operation required by said branch instruction is to be allowed based upon the branch instruction; and second means responsive to a negative detection result by said first means for invalidating a set of data including the target instruction for the branch instruction among the sets of data stored in said storage means.

11. A digital processor according to claim 1, wherein said storage means comprises means for storing a branch instruction as part of each set of data stored therein.

12. A digital processor according to claim 1, wherein:

each set of data held by said storage means further includes plural instructions to be executed after a target instruction in each set; and said supplying means includes means for sequentially supplying a target instruction and plural instructions read out from said storage means.

13. A digital processor, comprising:

a main storage;

instruction register means for holding an instruction to be executed;

decode means connected to said instruction register means for detecting whether or not the instruction held thereby is a branch instruction;

instruction address means responsive to supplying of an instruction into said instruction register means for generating an instruction address of said instruction;

address data means connected to said instruction register means and responsive to a branch instruction held in said instruction register means for generating address data related to the address of a target instruction for the breanch instruction held in said instruction register means;

storage means for storing plural sets of data, each set including a branch instruction address of a branch instruction, a target instruction for the branch instruction and address data related to that target instruction;

instruction supply means connected to said storage means, said instruction address means and said address data means and responsive to detection of the branch instruction by said decode means for reading from said storage means a target instruction for the branch instruction included in one of said sets of data selected in accordance with both the branch instruction address given by said instruction address means and said address data given by said address data means and for reading a target instruction from said main storage in response to said address data given by said address data means when no set of data within said storage means includes both said branch instruction address and said address data given by said address data means, so as to supply the target instruction read out from said storage means or said main storage to said instruction register means; and operation means connected to said instruction register means for detecting whether or not a branch condition requested by the branch instruction is satisfied;

write means connected to said storage means, said instruction supply means and responsive to detection that the branch condition is satisfied for writing into said storage means a set of data comprised of the target instruction read out from the main storage, said branch instruction address and said address data, when no set of data within said storage means includes said branch instruction address and said address data.

14. A digital processor according to claim 13, wherein:

each set of data held by said storage means further includes plural instructions to be executed after a target instruction in each set; and said instruction supply means includes means for sequentially supplying a target instruction and plural instructions read out from said storage means to said instruction register means.

* * * * *